US009916363B2

United States Patent
Tian et al.

(10) Patent No.: US 9,916,363 B2
(45) Date of Patent: Mar. 13, 2018

(54) METHOD AND APPARATUS FOR FLEXIBLE DIVERSIFICATION OF RECOMMENDATION RESULTS

(75) Inventors: Jilei Tian, Beijing (CN); Shaowei Jiang, Beijing (CN); Xinxing Yang, Suzhou (CN); Dong Liu, Beijing (CN); Hao Yang, Montrose, NY (US)

(73) Assignee: Nokia Technologies Oy, Espoo (FI)

( * ) Notice: Subject to any disclaimer, the term of this patent is extended or adjusted under 35 U.S.C. 154(b) by 278 days.

(21) Appl. No.: 14/112,090

(22) PCT Filed: Apr. 19, 2011

(86) PCT No.: PCT/CN2011/073031
§ 371 (c)(1),
(2), (4) Date: Oct. 16, 2013

(87) PCT Pub. No.: WO2012/142751
PCT Pub. Date: Oct. 26, 2012

(65) Prior Publication Data
US 2014/0046965 A1    Feb. 13, 2014

(51) Int. Cl.
*G06F 7/00* (2006.01)
*G06F 17/30* (2006.01)
(52) U.S. Cl.
CPC ...... *G06F 17/3053* (2013.01); *G06F 17/3064* (2013.01); *G06F 17/30522* (2013.01); *G06F 17/30648* (2013.01); *G06F 17/30867* (2013.01)
(58) Field of Classification Search
None
See application file for complete search history.

(56) References Cited

U.S. PATENT DOCUMENTS

| 7,346,839 | B2* | 3/2008 | Acharya et al. | |
| 7,689,615 | B2* | 3/2010 | Burges | G06F 17/30702 |
| | | | | 707/706 |
| 8,407,178 | B2* | 3/2013 | Hicks | G06Q 30/0269 |
| | | | | 706/52 |
| 8,412,718 | B1* | 4/2013 | Bilger | G06Q 30/0631 |
| | | | | 705/14.4 |
| 2008/0109285 | A1* | 5/2008 | Reuther | G06F 17/30864 |
| | | | | 705/7.11 |

(Continued)

FOREIGN PATENT DOCUMENTS

| CN | 101489107 A | 7/2009 |
| CN | 101751448 A | 6/2010 |
| WO | 2011/007631 A1 | 1/2011 |

OTHER PUBLICATIONS

Ziegler et al., "Improving Recommendation Lists Through Topic Diversification", Proceedings of the 14th International Conference on World Wide Web, May 10-14, 2005, pp. 22-32.

(Continued)

*Primary Examiner* — Uyen Le
(74) *Attorney, Agent, or Firm* — Ditthavong & Steiner, P.C.

(57) ABSTRACT

An approach is provided for diversifying recommendation results. A diversification manager determines one or more recommendation scores associated with one or more items. The one or more recommendation scores are for determining a sort order of the one or more items. The diversification manager then determines similarity information associated with the one or more items, and processes and/or facilitates a processing of the similarity information to cause, at least in part, an adjustment of the one or more recommendation scores, the sort order, or a combination thereof.

17 Claims, 11 Drawing Sheets

(56) References Cited

U.S. PATENT DOCUMENTS

| | | | | |
|---|---|---|---|---|
| 2008/0250312 | A1* | 10/2008 | Curtis | G06Q 10/00 715/700 |
| 2009/0313239 | A1* | 12/2009 | Wen et al. | 707/5 |
| 2010/0235317 | A1 | 9/2010 | Yu et al. | |
| 2011/0087679 | A1* | 4/2011 | Rosato | G06F 17/30867 707/749 |
| 2016/0092573 | A1* | 3/2016 | Stouffer | G06F 17/30864 707/706 |

OTHER PUBLICATIONS

Yu et al., "Recommendation Diversification Using Explanations", IEEE International Conference on Data Engineering, Mar. 29-Apr. 2, 2009, 4 pages.

Extended European Search Report received for corresponding European Patent Application No. 11863737.0, dated Sep. 19, 2014, 4 pages.

International Search Report and Written Opinion received in corresponding Patent Cooperation Treaty Application No. PCT/CN2011/073031, dated Feb. 9, 2012. 11 pages.

Office Action for corresponding Chinese Patent Application No. 2011800716980, dated Apr. 29, 2016, with English Language Summary, 14 pages.

Office Action for corresponding Chinese Patent Application No. 201180071698.0, dated Feb. 4, 2017, English Language Summary Included, 11 pages.

Office Action for corresponding Chinese Patent Application No. 201180071698.0, dated Sep. 4, 2017, English Language Summary Included, 12 pages.

* cited by examiner

Item 1: Restaurant X, Location: Y1, Discount: 80%; Date: 1-5 April 2011
Item 2: Restaurant X, Location: Y2, Discount: 80%; Date: 1-7 April 2011
Item 3: Restaurant X, Location: Y3, Discount: 85%; Date: 1-7 April 2011
Item 4: Restaurant X, Location: Y4, Discount: 90%; Date: 2-8 April 2011
Item 5: Restaurant X, Location: Y5, Discount: 90%; Date: 2-9 April 2011
Item 6: Restaurant X, Location: Y6, Discount: 90%; Date: 2-9 April 2011
...

803

Item 1: Restaurant X, Location: Y1, Discount: 80%; Date: 1-5 April 2011
Item 7: Phone 2, Location: Y1, Discount: 30%; Date: 1-7 April 2011
Item 10: Phone 8, Location: Y2, Discount: 20%; Date: 1-7 April 2011
Item 9: Clothing Brand A, Location: Y2, Discount: 50%; Date: 5-8 April 2011
Item 8: Restaurant Z, Location: Y3, Discount: 90%; Date: 2-9 April 2011
Item 2: Restaurant X, Location: Y2, Discount: 80%; Date: 1-7 April 2011
...

METHOD AND APPARATUS FOR FLEXIBLE DIVERSIFICATION OF RECOMMENDATION RESULTS

RELATED APPLICATION

This application was originally filed as PCT Application No. PCT/CN2011/073031 filed Apr. 19, 2011.

BACKGROUND

Service providers and device manufacturers (e.g., wireless, cellular, etc.) are continually challenged to deliver value and convenience to consumers by, for example, providing compelling network services. One area of development has been the use of recommendation systems to provide users with suggestions or recommendations for content, items, etc. available within the services and/or related applications (e.g., recommendations regarding people, places, or things of interest such as companions, restaurants, stores, vacations, movies, video on demand, books, songs, software, articles, news, images, etc.). For example, a typical recommendation system may suggest an item to a user based on a prediction that the user would be interested in the item—even if that user has never considered the item before—by comparing the user's preferences to one or more reference characteristics based on for example, collaborative filtering. However, traditional recommendation systems often produce results that are homogenous (e.g., recommended items tend to be very similar), thereby limiting information acquisition which leads to a potentially worse user experience. Accordingly, service providers and device manufacturers face significant technical challenges to enable recommendations that span a variety of user preferences.

SOME EXAMPLE EMBODIMENTS

Therefore, there is a need for diversifying recommendation results.

According to one embodiment, a method comprises determining one or more recommendation scores associated with one or more items, wherein the one or more recommendation scores are for determining a sort order of the one or more items. The method also comprises determining similarity information associated with the one or more items. The method further comprises processing and/or facilitating a processing of the similarity information to cause, at least in part, an adjustment of the one or more recommendation scores, the sort order, or a combination thereof.

According to another embodiment, an apparatus comprises at least one processor, and at least one memory including computer program code for one or more computer programs, the at least one memory and the computer program code configured to, with the at least one processor, cause, at least in part, the apparatus to determine one or more recommendation scores associated with one or more items, wherein the one or more recommendation scores are for determining a sort order of the one or more items. The apparatus is also caused to determine similarity information associated with the one or more items. The apparatus further is further caused to process and/or facilitate a processing of the similarity information to cause, at least in part, an adjustment of the one or more recommendation scores, the sort order, or a combination thereof.

According to another embodiment, a computer-readable storage medium carries one or more sequences of one or more instructions which, when executed by one or more processors, cause, at least in part, an apparatus to determine one or more recommendation scores associated with one or more items, wherein the one or more recommendation scores are for determining a sort order of the one or more items. The apparatus is also caused to determine similarity information associated with the one or more items. The apparatus further is further caused to process and/or facilitate a processing of the similarity information to cause, at least in part, an adjustment of the one or more recommendation scores, the sort order, or a combination thereof.

According to another embodiment, an apparatus comprises means for determining one or more recommendation scores associated with one or more items, wherein the one or more recommendation scores are for determining a sort order of the one or more items. The apparatus also comprises means for determining similarity information associated with the one or more items. The apparatus further comprises means for processing and/or facilitating a processing of the similarity information to cause, at least in part, an adjustment of the one or more recommendation scores, the sort order, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 8 is a diagram of user interfaces used in the processes FIGS. 1-5, according to various embodiments;

DESCRIPTION OF SOME EMBODIMENTS

Examples of a method, apparatus, and computer program for diversifying recommendation results are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
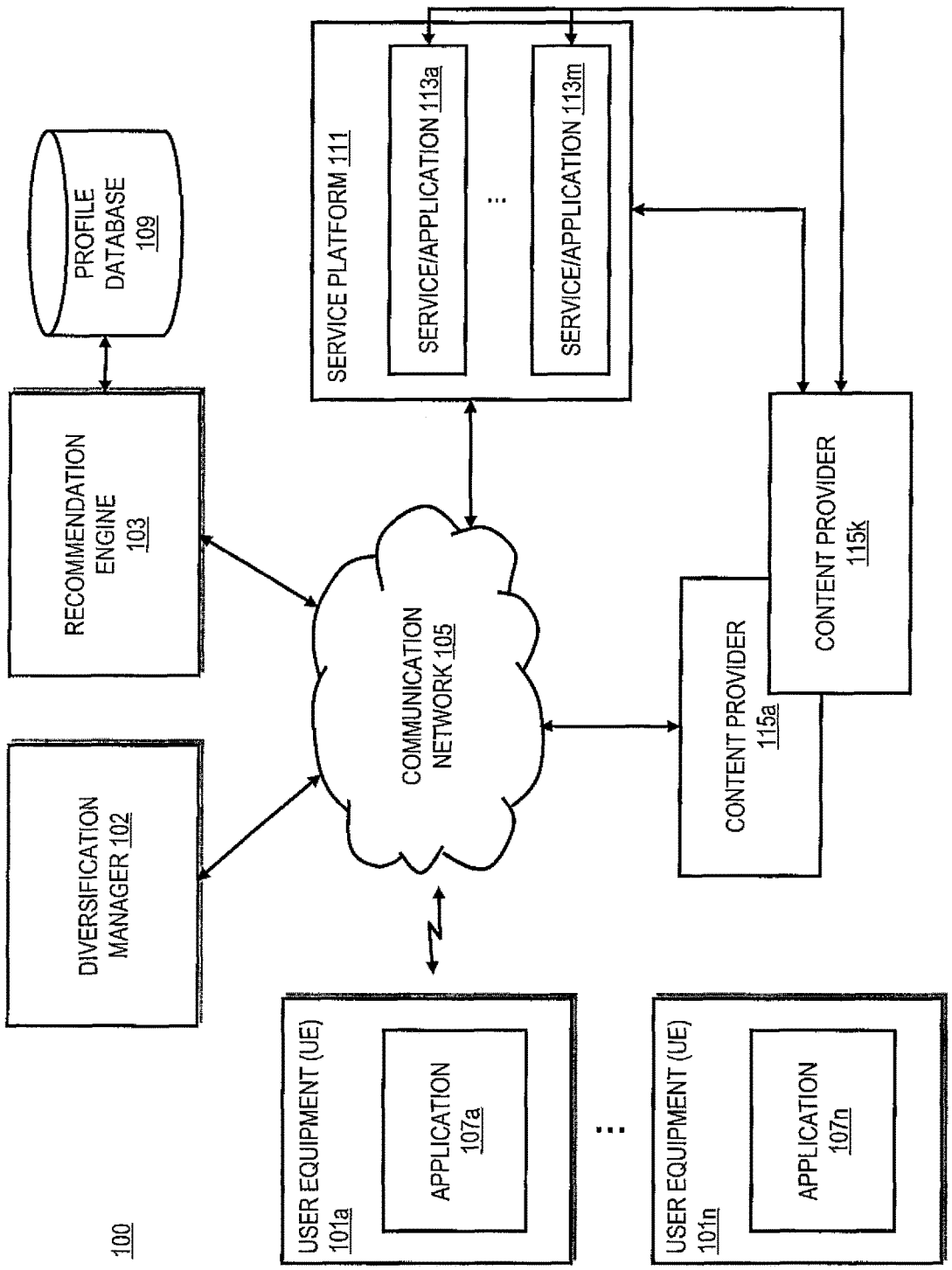
FIG. 1 is a diagram of a system capable of diversifying recommendation results, according to one embodiment.

FIG. 1 is a diagram of a system capable of providing a framework for generating recommendation models, according to one embodiment. Modem recommendation systems provide users with a number of advantages over traditional methods of search in that recommendation systems not only circumvent the time and effort of searching for items of interest, but they may also help users discover items that the users may not have found themselves. However, recommendation systems tend to overspecialized or produce results that are very similar to each other, regardless of what algorithms are used (e.g., collaborative filtering (CF) or content-based algorithms). By way of example, collaborative filtering (CF) is a core technology of most recommendation systems. In general terms, CF is the process for information or patterns using techniques involving collaboration among multiple agents, viewpoints, data sources, etc. For example, CF analyzes relationships between users and interdependencies among items (e.g., products, services, offers, deals, etc.) to identify and/or predict associations (e.g., preference information) between new users and the items.

Because users generally have broader interests, the homogeneous results may cause a user to start browsing for additional content because the user has other interests that have not been met, creating an inconvenience for the user. Moreover, such recommendation systems may reduce the choices that the user has to explore alternative relevant items. Accordingly, recommendation systems should provide a balance between a user's wide-ranging needs and relevancy. For example, with respect to shopping services, a user normally has a wide range of shopping interests such as clothing, consumer electronics, food, etc. In practice, there often are many similar deals from different merchants that can be recommended at any given time. Traditional recommendation systems usually rank or sort the recommendation results with very similar content next to each other in the sort list. Consequently, the sort list can have long lists of the same or similar items immediately adjacent to each other. This, in turn, may cause inconvenience or boredom for the consumer who wants to browse a greater variety of items.

Moreover, traditional approaches to diversifying recommendation results typically depend on modifying recommendation algorithms and then reprocessing the underlying data based on the modified algorithms. This process is often resource intensive (e.g., in terms of computational resources, storage, bandwidth, etc.) and can take a significant amount of time to complete. The time and resource burden can be problematic particularly when recommending items that have short or quick lifespans which can require at least near real-time processing. By way of example, deals (e.g., coupons, discounts, offers, group shopping offers, etc.) are one class of potentially short lifespan items. Most deals are valid for a relatively short period time (e.g., typically one to several days).

To address this problem, a system 100 of FIG. 1 introduces the capability to diversify recommendation results by adjusting recommendation or ranking scores based on the similarity of the underlying items. In one embodiment, the system 100 classifies recommended items based, at least in part, on one or more features such as category, keywords, tags, item type, information source, item location, etc. The system 100 can then process the features to determine similarity information associated with the one or more items. In one embodiment, the similarity information is based on whether the one or more items have identical or similar features. Using the similarity information along with the recommendation scores of the one or more items, the system 100 can adjust (e.g., increase or decrease) the scores to enlarge ranking or sort order differences against adjacent homogenous or similar items. More specifically, in certain embodiments, the system 100 need not perform calculations to determine similarity. Instead, the system 100 can compare whether the one or more items have common features and then apply an adjustment to the scoring, ranking, sort order, etc. accordingly. In this way, the system 100 can provide more diversity or breakdown the "stickiness" (e.g., the tendency to recommend groups of similar items) of recommended items. Because of the efficiency of the comparison and adjustment approach, the system 100 can typically perform the reordering or diversification of the items in one pass scanning of the original sort order or ranking list. In some embodiments, the system 100 can perform the diversification on either one or more subsets of the items in the ranking list to further enhance system performance and efficiency.

In one embodiment, the adjustment of the recommendation scores can be performed as a post-processing step following generation of the recommendation scores. In this way, the diversification or adjustment process does not depend on any particular recommendation strategy or technology because diversification is separated from the algorithmic portions of the recommendation process. Accordingly, the various embodiments of the approach described herein are compatible with any recommendation technology including CF-based recommendations and content-based recommendations. Moreover, the adjustment process is relatively lightweight from a resource burden standpoint (e.g., requires relatively small amounts of computational resources) and can be performed quickly or in substantially real time.

In one embodiment, the system 100 can specify one or more diversification parameters to control to what extent the homogeneity of recommended items will adjust their respective recommendations and/or the sort order on a ranking list. In other words, the granularity of the diversification can be set according to one or more parameters.

In one embodiment, the system 100 can provide a recommendation engine for generating recommendation scores for the diversification process. In some embodiments, the recommendation engine is applicable to a plurality of applications or services, for instance, through the use of a schema (or schemas) (e.g., outlines, templates, rules, definitions, etc.) for collecting and sharing information among the applications to support generation of recommendation models (e.g., CF-based models). In one embodiment, the system 100 can use the schema for the purpose of specifying a format for content rating information. As used herein, rating information refers to data indicating how a user has rated an item within a particular application (e.g., representing user interaction information). In one embodiment, the rating information may be explicitly provided (e.g., by specifying a number stars for a music track, thumbs up for a movie, etc.) or implicitly determined (e.g., based length of time an application item is used or accessed, frequency of use, etc.). The rating information collected from the various applications can then be pooled, associated, etc. based on the schema discussed above. In this way, the system 100 may collect the content rating information from one or more applications based on the schema for use in generating recommendation models for any of the participating applications, thereby maximizing the pool of available data (e.g., rating information) when compared to collecting information from only one application to support a standalone recommendation model. Under the various embodiments of the approach described herein, the pool of available data can be processed or mapped to a feature space to support feature-based CF.

In certain embodiments, the system 100 enables application developers to extend the schema to include new types of rating information. For example, if the schema is defined using a structured language (e.g., eXtensible Markup Language (XML)), an application developer may extend the schema by adding a new namespace to represent the new type of rating information. Accordingly, if one application cannot resolve or does not understand the new namespace, the namespace can be ignored. In addition or alternatively, if no schema is available to relate rating information collected from multiple applications, the system 100 can apply, for instance, a semantic analysis to infer the relationships between one set of rating information to another set. For example, rating information for a music application may include ratings or terms that can be semantically linked to rating information for an e-book application. In this way, if the system 100 has collected rating information from both types of applications, the collective set of rating information can still be semantically linked to enable the collective to support the generation of recommendation models for the respective applications or a new application such as recommending e-books or music according to collected data under the common framework of the system 100.

As previously discussed, the collected rating information may be stored, for instance, in one or more profiles (e.g., profiles associated with users and/or application items) for later use by a recommendation engine and/or any of the participating applications. A recommendation system (such as collaborative recommendation system) requires a recommendation model to provide recommendations. For example, the system 100 may receive a request to generate a recommendation model from a particular application and then may use the rating information from the one or more profiles to generate the requested recommendation model. In a further embodiment, the system 100 may extract data from the rating information collected from multiple applications based on a relevance of the data to the requesting application. The extracted data is then utilized in generating the content recommendation model for the requesting application. As such, applications may request recommendations models from the common framework or recommendation engine of the system 100 rather developing a separate recommendation framework or engine for each individual application. In this way, the system 100 advantageously enables sharing of the recommendation engine to reduce the computation, memory, bandwidth, storage, and other resource burdens associated with developing application specific recommendation models. Furthermore, the system 100 may provide complementary data for the requesting application that would not have been possible if the application were to collect the data on its own, In addition to improving efficiency by using a common framework for generating recommendation models for multiple applications, the common framework of the system 100 enables the information collected from one or more applications to be used to generate a recommendation model for another application. For example, some subsets of data in the content rating information may be relevant to a particular application and not other applications, while other subsets are relevant to the other applications, but not the particular application. Thus, the content rating information may support the generation of a plurality of content recommendation models for a plurality of applications. Furthermore, the same content recommendation models may be reused in such an environment where the models are applicable to a plurality of applications. A circumstance where a previously generated content recommendation model for an application may be provided to other applications is, for instance, where there is some relationship between the application and the other applications that would indicate similar items and users (e.g., a jazz music blog and a jazz music store program).

More specifically, the system 100 may receive a request, at a recommendation engine, for generating a content recommendation model for an application, wherein the recommendation engine is applicable to a plurality of applications. The request may be received from or transmitted by the application for which the content recommendation model is to be generated. Moreover, the request may be made by one or more users (e.g., administrators, developers, regular users, etc.) of the application, for instance, to improve the recommendations produced by the application. The system 100 may then retrieve content rating information from one or more profiles associated with the application, one or more other applications, or a combination thereof. The system 100 may further generate the content recommendation model based on the content rating information.

As shown in FIG. 1, the system 100 comprises a user equipment (UE) 101 or multiple UEs 101a-101n (or UEs 101) having connectivity to a diversification manager 102 and a recommendation engine 103 via a communication network 105. A UE 101 may include or have access to an application 107 (or applications 107), which may comprise of client programs, services, or the like that may utilize a system to provide recommendations to users. In one embodiment, the diversification manager 102 can perform various embodiments of the recommendation adjustment process describe herein using the recommendations generated by the recommendation engine 103.

As users utilize the applications 107 on their respective UEs 101, the recommendation engine 103 may collect content rating information (e.g., data indicating how a user might rate an item) from the applications 107. By way of example, content rating information collection might include asking a user to rate an item on a scale of one through ten, asking a user to create a list of items that the user likes, observing items that the user views, obtaining a list of items that the user purchases, analyzing the user's viewing times of particular items, etc. Likewise, the recommendation engine 103 may also provide the applications 107 with content recommendation models based on the content rating information that the applications 107 may utilize to produce intelligent recommendations to its users. As such, the recommendation engine 103 may include or be connected to a profile database 109 in order to access or store content rating information. Within the profile database 109, the content rating information may be stored or associated with, for instance, one or more respective user profiles. It is noted, however, that the profile database 109 may also contain other profile types, such as application profiles, item profiles, etc.

As shown, the UEs 101, the diversification manager 102, and the recommendation engine 103 also have connectivity to a service platform 111 hosting one or more respective services/applications 113a-113m (also collectively referred to as services/applications 113), and content providers 115a-115k (also collectively referred to as content providers 115). In one embodiment, the services/applications 113a-113m comprise the server-side components corresponding to the applications 107a-107n operating within the UEs 101. In one embodiment, the service platform 111, the services/applications 113a-113m, the application 107a-107n, or a combination thereof have access to, provide, deliver, etc. one or more items associated with the content providers 115a-115k. In other words, content and/or items are delivered from the content providers 115a-115k to the applications 107a-107n or the UEs 101 through the service platform 111 and/or the services/applications 113a-113n. In one embodiment, the services/applications 113a-113m may relate to recommending short lifespan items (e.g., deals, coupons, discounts, offers, etc.).

In some cases, a developer of the services/applications 113a-113m and/or the applications 107a-107n may request that the recommendation engine 103 generate one or more recommendation models with respect to content or items obtained from the content providers 115a-115k. The developer may, for instance, transmit the request on behalf of the application 107 and/or the services/applications 113 to the recommendation engine 103 for the purpose of generating a recommendation model and/or populating the recommendation model with sufficient data in order for the application to provide user recommendations. After receiving the request for the recommendation model, the recommendation engine 103 may then retrieve content rating information from one or more profiles associated with the application 107, the services/applications 113, one or more other applications, or a combination thereof.

The recommendation engine 103 may further generate the content recommendation model based on the content rating information. Because the content rating information may be derived from the one or more profiles associated with the application 107, the services/applications 113 and/or the one or more other applications, the generation of the content recommendation model is not limited only to profiles associated with the application 107 for which the generation request was made. Thus, even if the application 107 has few or no users, prior to the generation request, the recommendation engine 103 may still be able to generate a content recommendation model with enough data to produce accurate predictions with respect to suggesting items of interest to users. To further enhance the user experience, the diversification manager 102 can then process the recommendation results to ensure that the user is presented with a recommendation list that includes a variety of items of different types or categories. In addition, because the diversification manager 102 operates on recommendations results that have already been generated by the recommendation engine 103, the diversification process can be conducted with fewer resources and/or achieve better performance to tailor recommendations for the end user.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In an embodiment where the recommendation engine 103 employs CF- and/or content-based recommendation technologies, a subset of the content rating information may be extracted based on a relevance to a particular application. In a further embodiment, the generation of the content recommendation model may also be based on the subset extracted from the content rating information. By way of example, the content rating information can be mapped from item-based content rating to feature-based content rating. In addition or alternatively, content rating may be provided directly for the features or categories of the items. In one sample use case, a movie streaming application may make a request for a content recommendation model to provide its users with recommendations. The relevant subset that may be extracted from the content rating information may include all data associated with movies or films from the one or more profiles located, for instance, in the profile database 109. As a result, the application may not only obtain user profile information (e.g., user preferences) associated with films previously identified by the application, but also user profile information associated with films that were not known by the application prior to its request. If, for instance, the content recommendation model generated for the application indicates that many of its users would be interested in certain previously unknown movie titles, the application may automatically search and obtain these previously unknown movies. Accordingly, the application may recommend to its users these and other available movies based on the content recommendation model constructed from the relevant subset of the content rating information.

In another embodiment, a schema is determined for specifying the content rating information across multiple applications (e.g., applications 107, services/applications 113). The schema may be used to determine, for instance, the format or structure of the content rating information with respect to both items and/or features. In one embodiment, the schema may specify one or more taxonomies for defining features. In this way, the features can be standardized across one or more classes of items. By way of example, the schema may define elements and attributes that may appear in the content rating information, the order and number of element types, data types for elements and attributes, default or fixed values for elements and attributes, etc. Elements defined by the schema may include application classifications, item categories, rating types, users, relationships, etc. In one sample use case, a basic or a skeleton schema for specifying the content rating information may be predefined. However, application developers may be able to extend the basic or skeleton schema, for instance, by providing a new namespace. In yet another embodiment, the content rating information is collected from the application, the one or more other applications, or a combination thereof based on the schema. In a further embodiment, the collected content rating information is also stored based on the schema. In this way, the operations of the recommendation engine 103 are generally made more efficient. For example, the recommendation engine 103 may access data (e.g., the content rating information) in the profile database 109 to generate new content recommendation models for any application without first having to figure out how to interpret the data since the schema is already provided.

In another embodiment, the collected content rating information is aggregated in respective ones of the one or more profiles. As provided, the one or more profiles may include one or more user profiles. It is noted, however, that the profile database 109 may also contain other profile types, such as application profiles, item profiles, etc. By way of example, user profiles in the profile database 109 may include names, locations, age, gender, race/ethnicity, nationality, items viewed, item viewing times, items searched, items downloaded/uploaded, items purchased, items added to a wish list, shopping cart, or favorites list, items rated and how they were rated, etc. Accordingly, the one of more profiles may be accessed to provide the content rating information to generate content recommendation models for one or more applications.

In another embodiment, one or more relationships between a first portion of the content rating information associated with the application and a second portion of the content rating information associated with at least one of the one or more other applications is determined. In yet another embodiment, the generation of the content recommendation model is further based on the one or more relationships. In one sample use case, the content rating information may contain data associated with a movie streaming service and also data associated with an e-reader program. The recommendation engine 103, for instance, may determine that a relationship exists between data associated with the romance genre of the movie streaming service and data associated with the romance genre of the e-reader program. As a result, the content recommendation model generated based on the romance genre relationship may indicate, for instance, that users that like e-books and romance movies have similar interests as users that like movies and romance e-books. In a further embodiment, the determination of the one or more relationships is based on the schema, a semantic analysis of the content rating information, or a combination thereof. By way of example, the determination of the relationships may be based on the schema if the relationships are defined in the schema, based on the semantic analysis if the relationships are absent from the schema, or based on both if some relationships are defined and others relationships are not.

In another embodiment, a previously generated content recommendation model may be determined to at least partially satisfy the request. In one sample use case, a content recommendation model may have been previously generated for a music website targeted for a particular music genre, such as jazz music blog. Thereafter, a request is received, at the recommendation engine 103, for generating a content recommendation model for a jazz music program that enables users to sample and buy jazz music. Although the jazz music blog may not directly provide its users with the ability to sample and purchase music, the content recommendation model previously generated for the blog may still satisfy the request by the jazz music program. This is particularly useful if music rating data is not available or in cases where quantity and quality of music ratings data may not satisfy generation of a music model. For example, the previously generated content recommendation model may have been constructed based on content rating information from other applications that allow users to sample and purchase jazz music. As such, the previously generated content recommendation model not only makes it possible for the blog to intelligently suggest links for jazz music (e.g., to sample, download, or purchase jazz music) and/or related blogs, but it also may allow the program to accurately predict and offer jazz music of interest to its users. Thus, in a further embodiment, the previously generated content recommendation model may be provided in response to the request. In this way, system resources may be reserved for the generation of content recommendation models for other applications or for other operations, such as collecting, storing, or accessing content rating information from one or more other applications.

In another embodiment, the content recommendation model is updated based on a predetermined frequency, a predetermined schedule, a detection of one or more updates to the content rating information, or a combination thereof. It is noted that content recommendation model updates may be desired in many cases, but also necessary to continue to offer useful suggestions in other cases. For example, content recommendation model updates may be required when trends change. As such, past behavior of users may no longer be helpful in making accurate predictions. Thus, in a further embodiment, rating indications in the content rating information may contain timestamps. In this way, old data may be filtered out from the content rating information when generating content recommendation models for particular applications where, for instance, user trends have changed for those applications.

In another embodiment, the content recommendation model defines a matrix for predicting an anticipated rating for one or more items of the application relative to the one or more profiles. By way of example, the content recommendation model may define a user vs. item matrix, wherein the matrix indicates how each user might rate a particular item. In addition, the content recommendation model may define a user vs. feature matrix, wherein the matrix indicates how each user might rate or prefer a particular feature or category of the items. In one embodiment, the indications of the ratings may be expressed, for instance, by a numerical value after each user profile variable (e.g., items viewed, item viewing times, items searched, items downloaded/ uploaded, items purchased, items added to a wish list, shopping cart, or favorites list, items rated and how they were rated, etc.) has been computed after being assigned a determined weight based on the application and/or other criteria. In one embodiment, the numerical value can be normalized to a particular scale or range (e.g., a value between 0 and 1). The matrix may also provide the indications simply by presenting the variables to the application. In this way, the application may assign weights to each variable and compute how each user might rate the items based on the assigned variable weights.

In some embodiments, the recommendation model and/or the matrix may be generated based, at least in part, on one or more additional parameters specified by the requesting service, the recommendation engine 103, and/or another component of the system 100. For example, in one embodiment, the recommendation engine 103 can create a factorized recommendation model (e.g., in the case of a matrix factorization approach to collaborative filters for generating recommendations). A parameter used to create the factorized recommendation model is, for instance, the number of latent topics to include that would be used to model each matrix (e.g., user matrix, item matrix, feature matrix). This parameter (i.e., the number of latent topics) can either be determined by the recommendation engine 103 (e.g., if the information is available to the recommendation engine 103), provided by the requesting application or service as input parameters is its request to generate a recommendation engine, or a combination thereof. It is noted that the parameters are often dependent on the nature of the applications, service, items, etc. relevant to service and are often specific to a particular recommendation model.

In another embodiment, the content rating information supports generation of a plurality of content recommendation models. As provided, there are many instances where the content rating information may support the generation of a plurality of content recommendation models. In one sample use case, a movie streaming service may make a request for a content recommendation model to provide its users with recommendations. The recommendation engine 103 may extract a subset of the content rating information retrieved from the one or more profiles in the profile database 109 based on a relevance to the movie streaming service, such as data associated with movies. However, the retrieved content rating information may also contain subsets that are not pertinent to the movie streaming service, but may be applicable to other unrelated applications, such as an e-reader program, a dating service, or a vacation blog. Accordingly, the different subsets of the content rating information may support the generation of more than one content recommendation model.

By way of example, the UE 101, the diversification manager 102, the recommendation engine 103, and the application 107 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In one embodiment, the application 107 and the corresponding service platform 111, services 113a-113m, the content providers 115a-115k, or a combination thereof interact according to a client-server model. It is noted that the client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
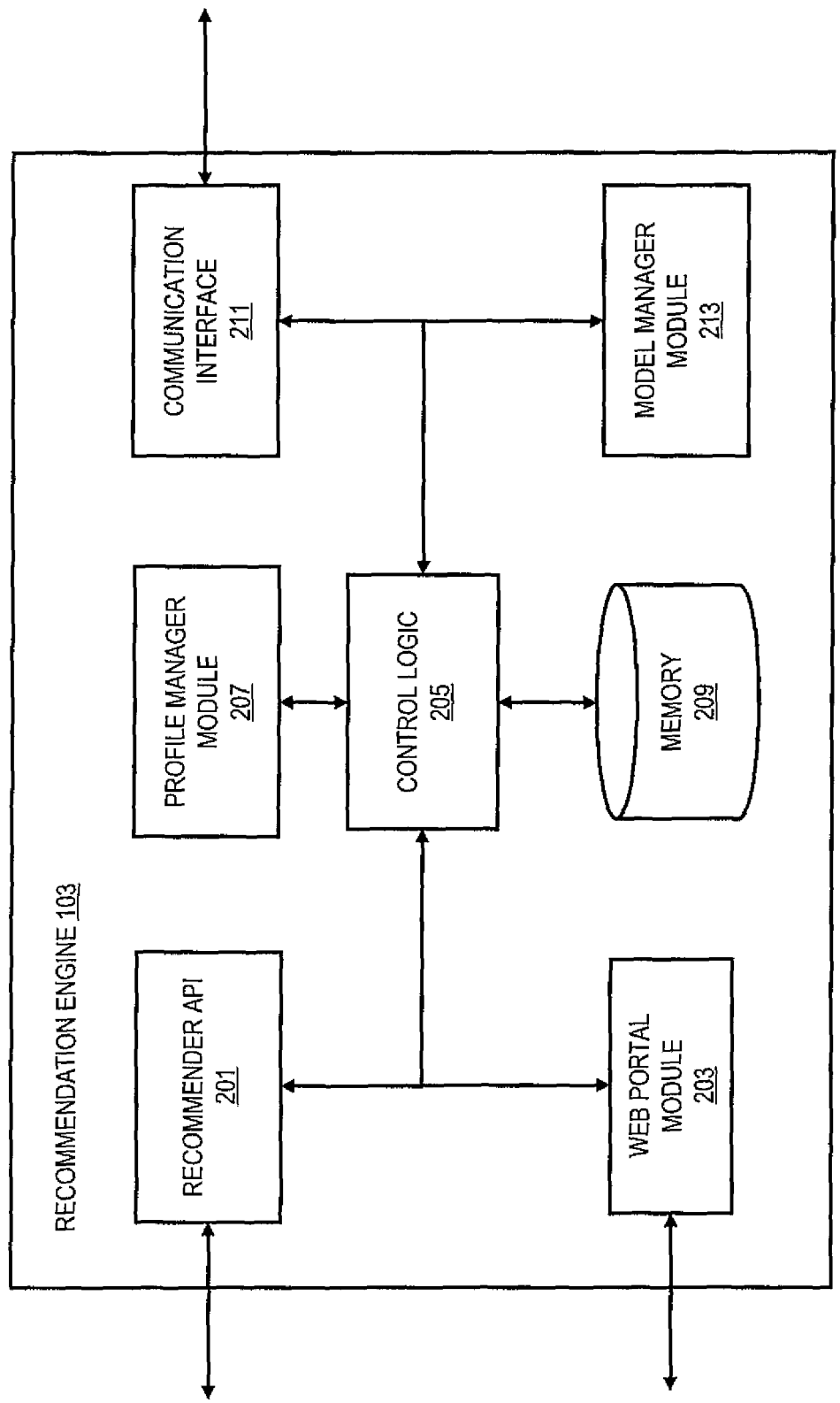
FIG. 2 is a diagram of the components of a recommendation engine, according to one embodiment.

FIG. 2 is a diagram of the components of a recommendation engine, according to one embodiment. By way of example, the recommendation engine 103 includes one or more components for providing a framework for generating recommendation models for use by the diversification manager 102. It is contemplated that the functions of these components may be combined in one or more components or performed by other components of equivalent functionality. In this embodiment, the recommendation engine 103 includes a recommendation API 201, a web portal module 203, control logic 205, a memory 209, a communication interface 211, and a model manager module 213.

The control logic 205 can be utilized in controlling the execution of modules and interfaces of the recommendation engine 103. The program modules can be stored in the memory 209 while executing. The communication interface 211 can be utilized to interact with UEs 101 (e.g., via a communication network 105). Further, the control logic 205 may utilize the recommendation API 201 (e.g., in conjunction with the communication interface 211) to interact with the diversification manager 102 as well as with the applications 107, the service platform 111, the services/applications 113, other applications, platforms, and/or the like.

The communication interface 211 may include multiple means of communication. For example, the communication interface 211 may be able to communicate over SMS, interne protocol, instant messaging, voice sessions (e.g., via a phone network), or other types of communication. The communication interface 211 can be used by the control logic 205 to communicate with the UEs 101a-101n, and other devices. In some examples, the communication interface 211 is used to transmit and receive information using protocols and methods associated with the recommendation API 201.

By way of example, the web portal module 203 may be utilized to facilitate access to modules or components of the recommendation engine 103, for instance, by developers. Accordingly, the web portal module 203 may generate a webpage and/or a web access API to enable developers to test or register their applications with the recommendation engine 103. Developer may further utilize the web page and/or the web access API to transmit a request to recommendation engine 103 for the generation of content recommendation models for their applications.

Figure 3:
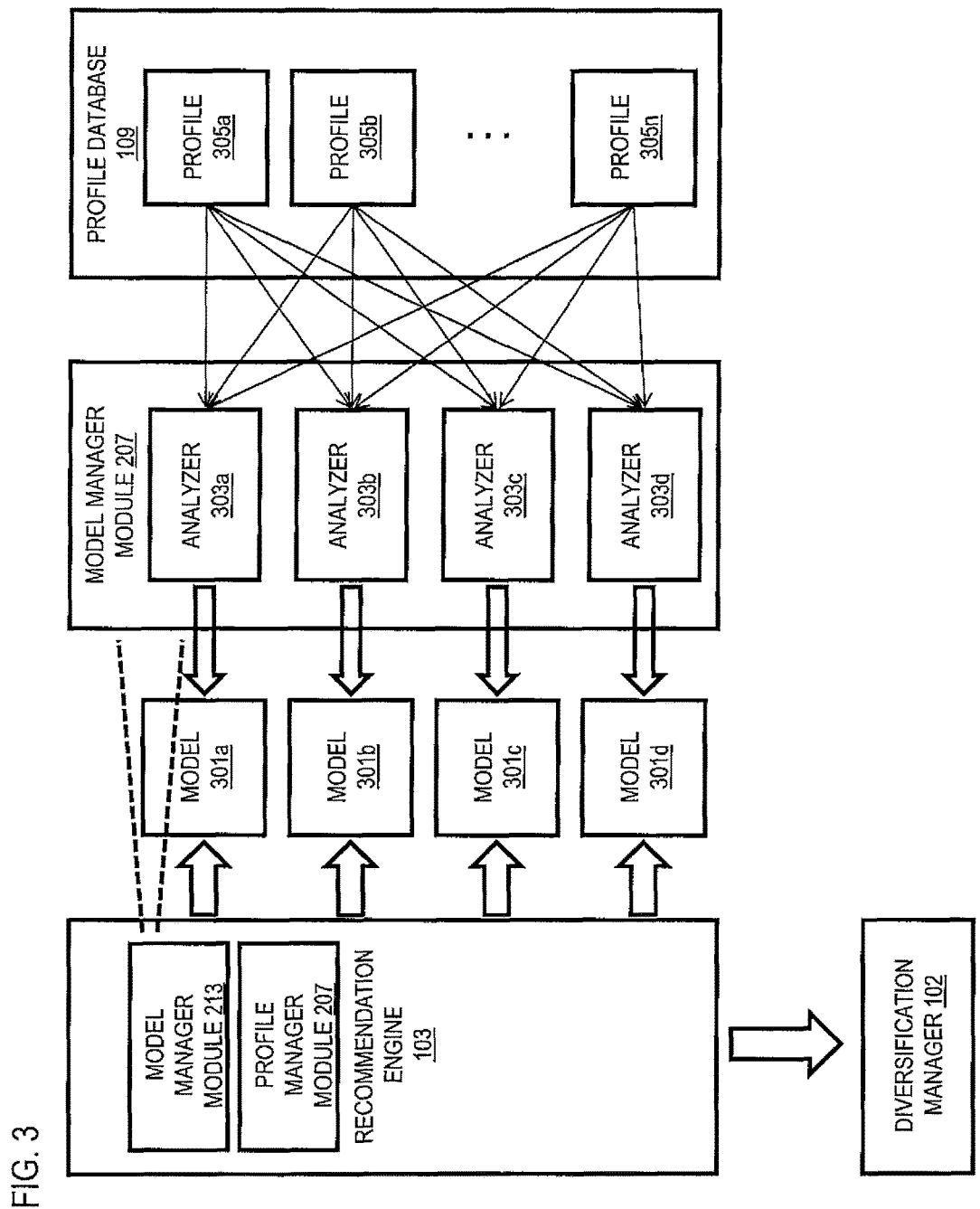
FIG. 3 is an example architecture of a recommendation framework, according to one embodiment.

Moreover, the profile manager module 207 may manage, store, or access data in the profile database 109. As such, the profile manager module 207 may determine how data from the content rating information should be stored or accessed (e.g., based on a schema). In addition, the model manager module 213 may handle the generation of content recommendation models. Thus, the model manager module 213 may interact with the profile manager module 207, via the control logic 205, to obtain the content rating information in order to generate the content recommendation models. As such, the model manager module 213 may further act as a filter in generating the content recommendation models from the content rating information such that data that does not meet certain criteria, such as relevance to a particular application, is not utilized in generating the content recommendation models, FIG. 3 is an example architecture of a recommendation framework for supporting a diversification manager 102, according to one embodiment. As shown, FIG. 3 presents the diversification manager 102, the recommendation engine 103, the profile database 109, the profile manager module 207, the model manager module 213, models 301a-301d, analyzers 303a-303d, and profiles 305a-305n. In this diagram, the recommendation engine 103 is simultaneously in the process of generating models 301a-301d (e.g., content recommendation models including both item-based CF models and feature-based CF models) for at least four different applications. As such, the recommendation engine 103 is applicable to a plurality of applications.

By way of example, when a request is received, at the recommendation engine 103, for generating a content recommendation model for an application, the recommendation engine 103 may retrieve, via the profile manager 207, content rating information from profiles 305a-305n in the profile database 109. The profiles 305a-305n, as discussed above, may be associated with the application, one or more other applications, or a combination thereof. Thereafter, the recommendation engine 103, via the model manager module 213, generates the content recommendation model based on the content rating information. During this step, the model manager module 213 may filter out data that may be unnecessary for the generation of the content recommendation model using the analyzers 303a-303d. Accordingly, only a subset of the content rating information may be extracted, for instance, based on a relevance to the application for the purpose of generating the content recommendation model. In addition, the analyzers 303a-303d may determine one or more relationships between a first portion of the content rating information associated with the application and a second portion of the content rating information associated with other applications for the purpose of generating the content recommendation model. To determine the relationships, the analyzers 303a-303b may rely on the schema and/or feature taxonomies used to specify the content rating information and/or a semantic analysis of the content rating information. If, for example, the relationships and/or items-to-features mapping are defined in the schema, the relationship determinations and/or mappings may be based on the schema. If the relationships are absent from the schema, the relationship determinations and/or mappings may be based on the semantic analysis. If some relationships are defined in the schema and other relationships are not, the relationship determined may be based on both the schema and the semantic analysis.

Simultaneously, the recommendation engine 103 may collect additional content rating information from the application and/or the one or more other applications based on the schema used to specify the content rating information. In one embodiment, the additional content rating information may be related to feature-based content rating whereby ratings are provided for item features in addition to or instead of the items themselves. The recommendation engine 103, via the profile manager module 207, may then aggregate the collected content rating information in the respective profiles 305a-305n in the profile database 109. On generating recommendations (e.g., including recommendation scores for a number of items), the recommendation engine 103 interacts with the diversification manager 102 for further post-processing of the recommendation results. In one embodiment, the interaction involves transmitting recommendation results to the diversification manager 102 with no further involvement of the recommendation engine 103 in the operation of the diversification manager 102, thereby maintaining the independence and separation of the diversification manager 102 from the recommendation engine 103.

Figure 4:
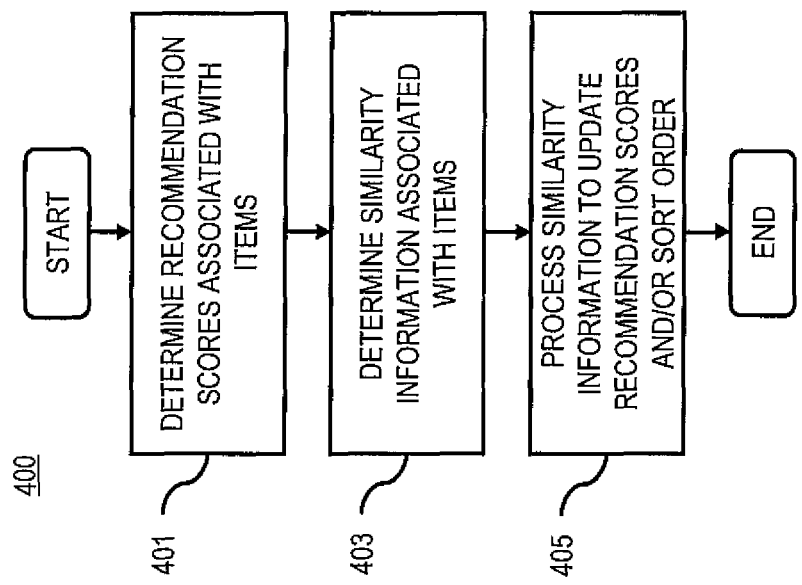
FIG. 4 is a flowchart of a process for diversifying recommendation results, according to one embodiment.
Figure 10:
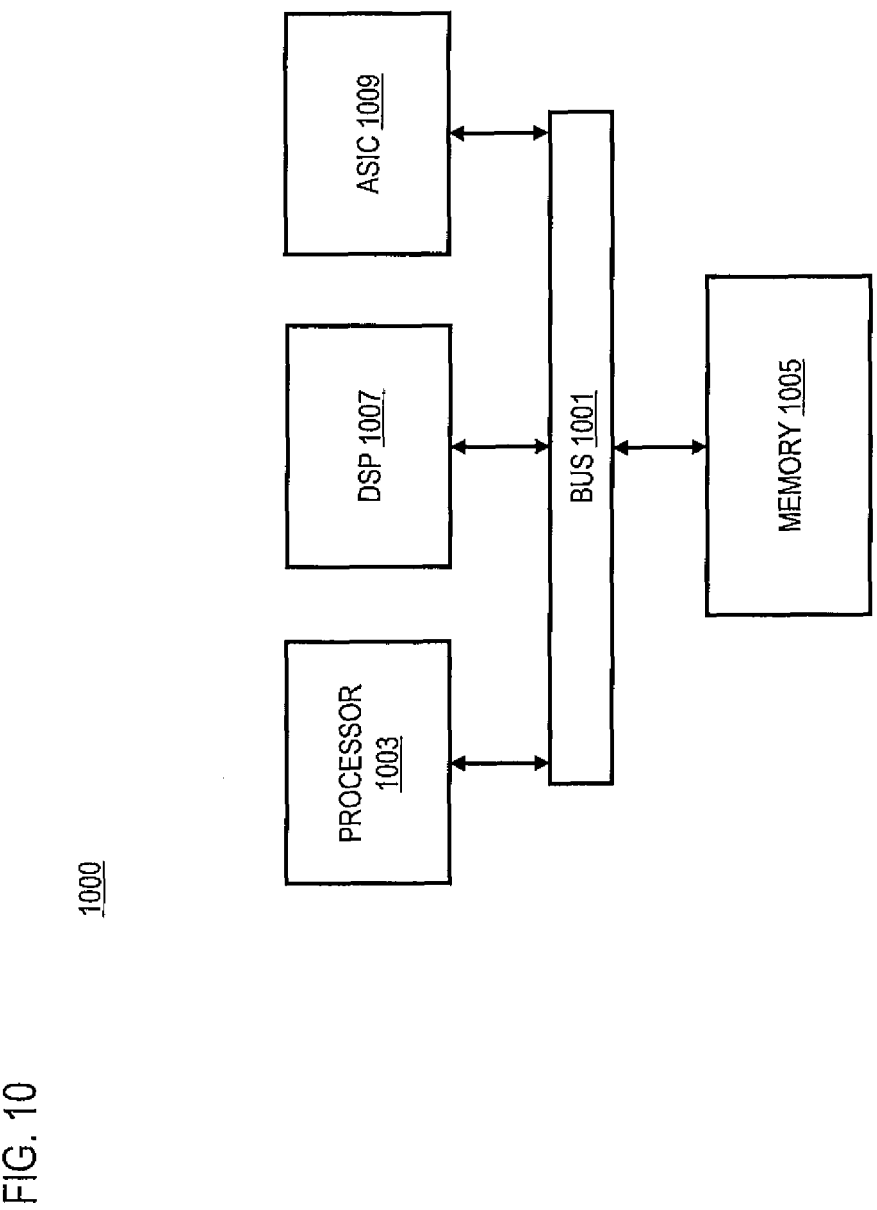
FIG. 10 is a diagram of a chip set that can be used to implement an embodiment of the invention.

FIG. 4 is a flowchart of a process for providing feature-based collaborative filtering, according to one embodiment. In one embodiment, the diversification manager 102 performs the process 400 and is implemented in, for instance, a chip set including a processor and a memory as shown in FIG. 10. In addition or alternatively, in some embodiments, it is contemplated that the recommendation engine 103 may perform all or a portion of the process 400. In step 401, diversification manager 102 determines one or more recommendation scores associated with one or more items, wherein the one or more recommendation scores are for determining a sort order of the one or more items. By way of example, the determination of the recommendation scores comprises requesting and/or receiving the recommendation scores from /the recommendation engine 103. Typically, the one or more items are ranked, sorted, and/or presented according to the recommendation scores.

Next, the diversification manager 102 determines similarity information associated with the one or more items (step 403). In one embodiment, the diversification manager 102 processes and/or facilitates a processing of the one or more features of the one or more items to determine the similarity information. The diversification manager 102, for instance, determines the similarity information with respect to a comparison of at least one of the one or more items and at least another one of the one or more items. This comparison provides greater efficiency (e.g., reduce resource burden) so that, in some embodiments, the functions of the diversification manager 102 can performed locally at a client (e.g., a UE 101) with, for instance, minimal if any assistance from backend components of the system 100. By way of example, the one or more features include, at least in part, one or more categories, one or more tags, one or more locations, one or more information sources, one or more recommendation types, or a combination thereof to determine the similarity information.

In step 405, the diversification manager 102 processes and/or facilitates a processing of the similarity information to cause, at least in part, an adjustment of the one or more recommendation scores, the sort order, or a combination thereof. In one embodiment, the adjustment comprises causing, at least in part, an application of a penalty to the respective one or more recommendation scores of the one or more items with the one or more features that are at least substantially similar. In some embodiments, the diversification manager 102 further determines proximity information of the one or more items with the one or more features that are at least substantially similar, wherein the proximity information is with respect to location in the sort order (e.g., adjacent items in the sort order). The diversification manager 102 then processes and/or facilitates a processing of the proximity information to adjust the penalty to apply to the affected recommendation scores. In one embodiment, the adjustment need not be applied globally, but may instead by applied to a subset or segment of the recommended items. In yet another embodiment, the amount of the adjustment can be controlled by application of one or more diversification factors. The adjustment process is discussed in more detail with respect to FIGS. 5-8 below.

Figure 5:
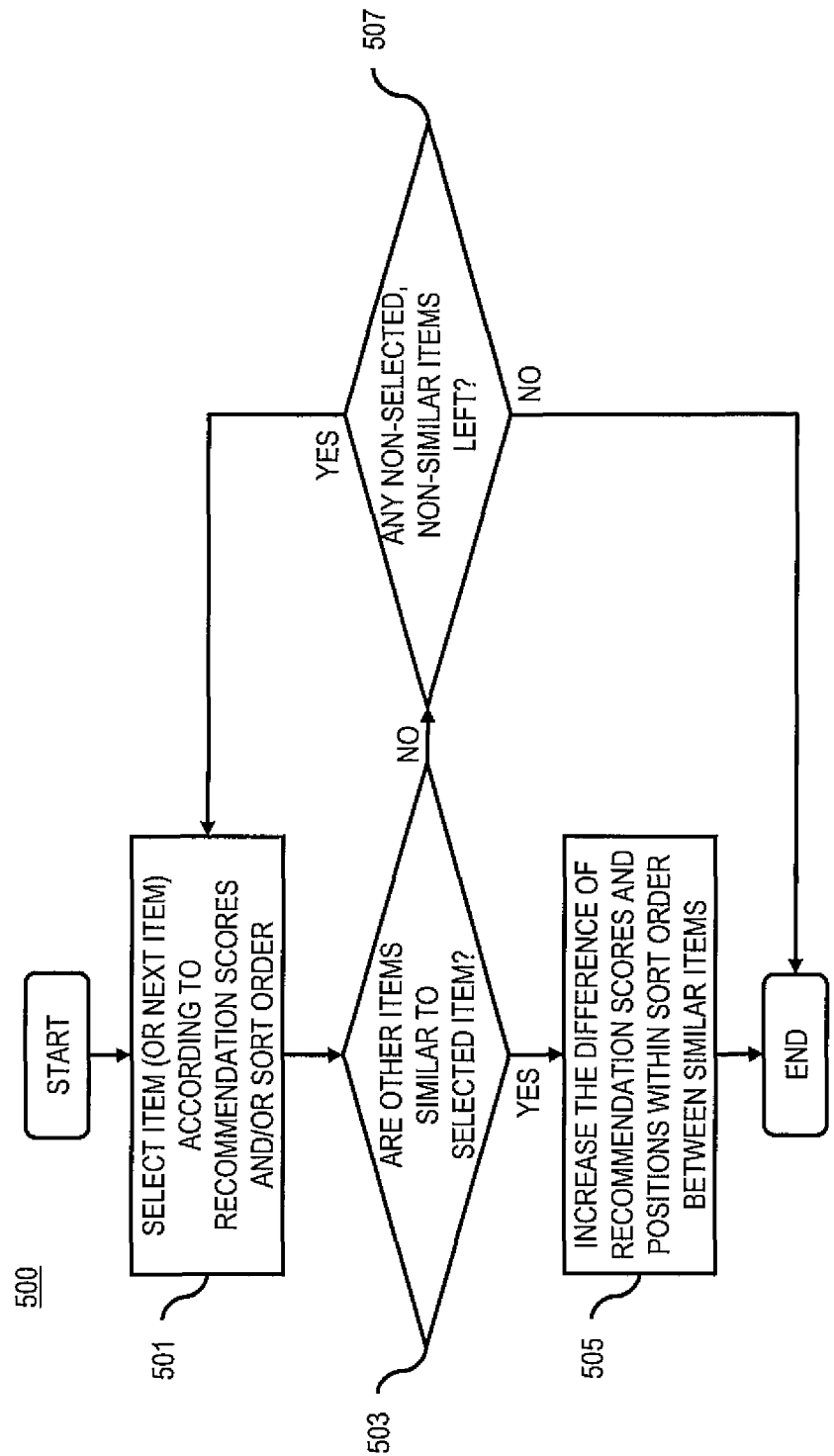
FIG. 5 is a flowchart of a process for adjusting recommendation scores, according to one embodiment.

FIG. 5 is a flowchart of a process for adjusting recommendation scores, according to one embodiment. In one embodiment, the diversification manager 102 performs the process 400 and is implemented in, for instance, a chip set including a processor and a memory as shown in FIG. 10. In addition or alternatively, in some embodiments, it is contemplated that the recommendation engine 103 may perform all or a portion of the process 400. In step 501, the diversification manager 102 selects an item (or next item) on the recommendation list based, at least in part, the recommendation scores or sort order of the item. In one embodiment, the selection initiates the diversification or adjustment process discussed in the various embodiments described herein.

Next, the diversification manager 102 determines whether there are other items similar to the selected item (step 503). In one embodiment, similarity is determined by comparing features between the selected item and the other items in the recommendation list. If the other items are similar, the diversification manager 102 increases the difference of the recommendation scores and/or relative positions within the sort order between similar items (step 505). In this way, the diversification manager 102 breaks the "stickiness" typical of traditional recommendation results to enhance the user experience by exposing the user to a greater variety of recommended items. If there are no other items similar to the selected item, the diversification manager determines whether there are any non-selected, non-similar items left in the recommendation list (step 507). If there are items left, the diversification manager 102 returns to step 501 to select the next item. Otherwise the process 500 ends.

Figure 6:
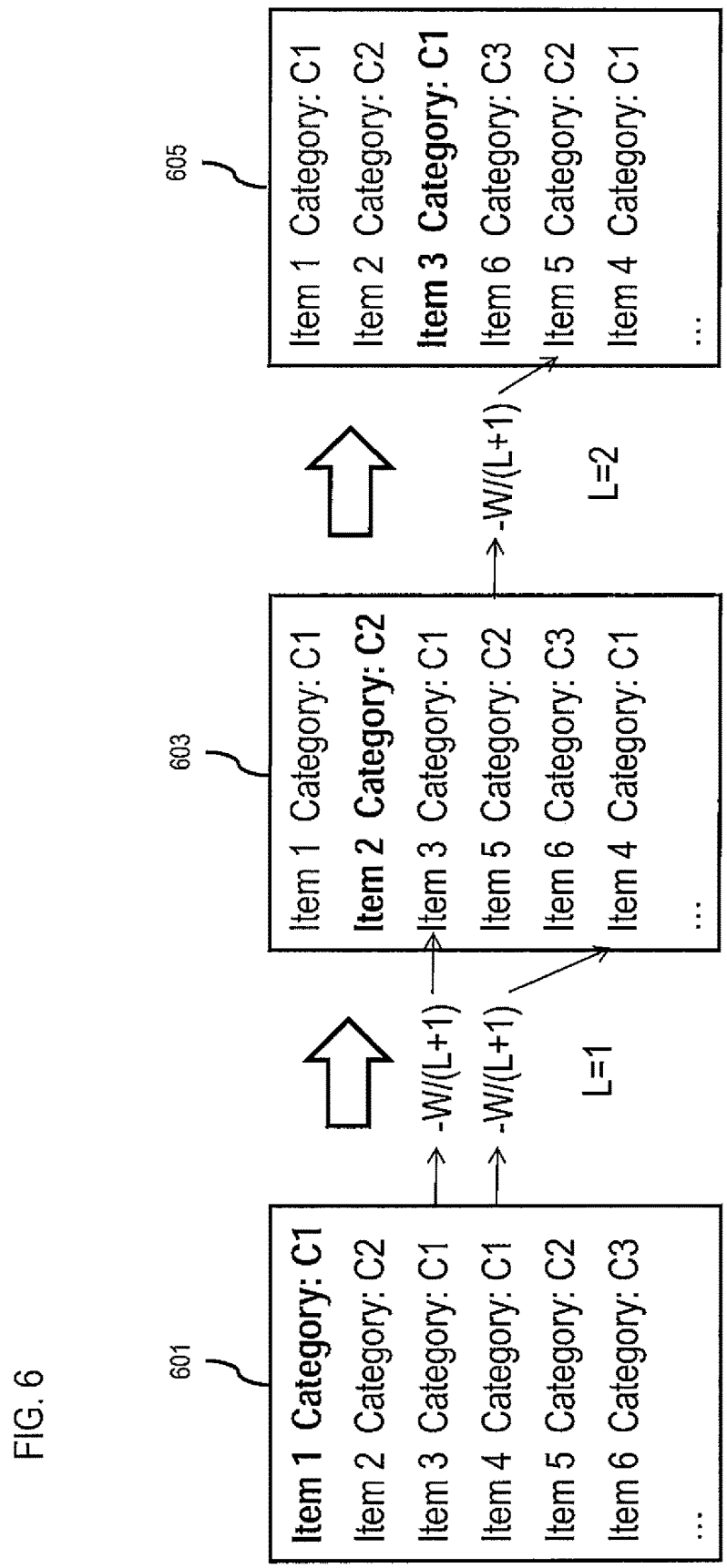
FIG. 6 is a diagram of an example use case of diversifying a recommendation list, according to one embodiment.

FIG. 6 is a diagram of an example use case of diversifying a recommendation list, according to one embodiment. More specifically, FIG. 6 depicts a visual presentation of the process described with respect to FIG. 5 above. As shown, a UI 601 shows a list of recommended items with the sort order and/or recommendation scores remaining unadjusted. The diversification manager 102 begins by selecting the first item in the list of UI 601 (e.g., "Item 1 Category: C1"). The selection causes the diversification manager 102 to search of other similar items (e.g., items in the category C1). In this example, Items 3 and Items 4 are both in Category C1. Accordingly, the diversification manager 102 applies an adjustment or penalty to their sort order based on their similarity to the selected item. In one embodiment, the adjustment is performed according to the equation: adjustment or penalty=$-W/(L+1)$, where W=a diversification parameter or weight to control the granularity of the adjustment, and L=the sort order or rank of the selected item (e.g., L=1 for Item 1).

In addition or alternatively, the diversification manager 102 can use other alternatives to adjust recommendations scores and/or sort orders. For example, in another embodiment, the diversification manager 102 can balance the diversification capability (e.g., large weight or diversification parameter W having very broad coverage where similar items are placed further apart in the sort order) and ranking position shift before and after the diversification (e.g., small weight W having very similar local items adjacent in the sort order) to reach an optimized value. One advantage of various embodiments of this approach is the ability to diversify the items using part of the item's features, and then process the ranked items in any segment of the original list of items. In other words, the diversification can be performed on just a subset of the items based, at least in part, on whether the items share the same feature(s). By comparing and/or matching item features, the diversification manager 102 need not perform more complex similarity calculations. Instead, the penalty or adjustment is made on the items that have identical or similar features.

Applying the equation to the list in UI 601, the diversification manager 102 generates the adjusted or re-ordered list in UI 603. In this case, Item 4 in category C1 has been reordered from the fourth position to the sixth position because C1 is already represented by Items 1 and 3. The diversification manager 102 then selects the next item (e.g., "Item 2 Category: C2") for processing by searching for other C2 items and applying the equation to generate the reordered list in UI 605. In this case, the parameter L for the sort order is now 2 for item two. In one embodiment, the process can continue for any number of iterations.

Figure 7:
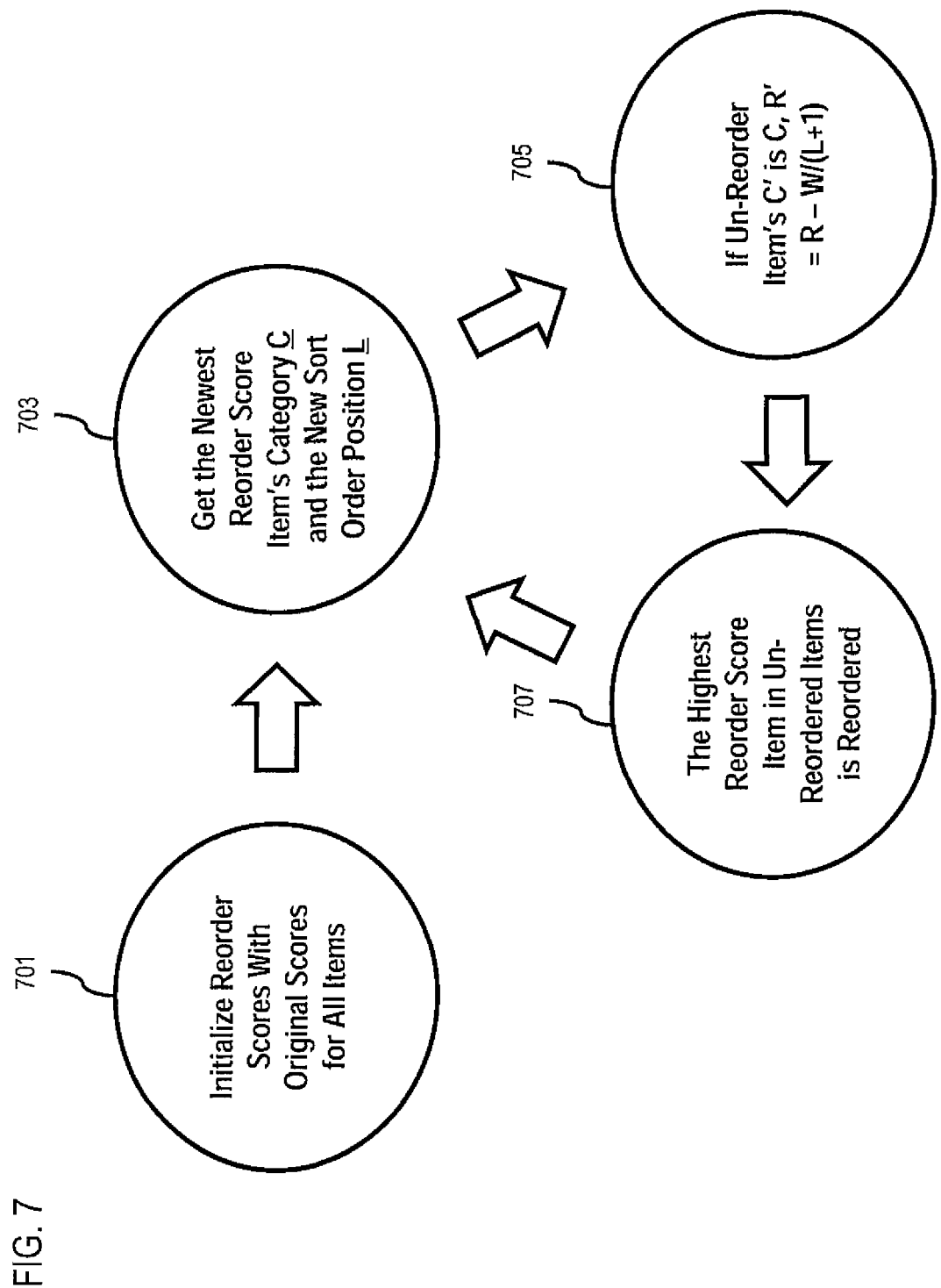
FIG. 7 is a diagram of an example implementation of a diversification process, according to one embodiment.

FIG. 7 is a diagram of an example implementation of a diversification process, according to one embodiment. In process 701, the diversification manager 102 initializes the diversification or adjustment process by initializing or setting the reorder scores equal to the originally scores as provided by, for instance, the recommendation engine 103 for all items. At process 703, the diversification manager 102 gets the category C and the new sort order or rank position of N of the item that has been most recently reordered (i.e., the new reorder score item).

At process 705, the category C is then compared to a category C' corresponding to an item that has not yet been reordered. If the C' matches C, then the diversification manager 102 generates a reorder position R' using the equation: $R'=R-W/(L+1)$, where R is original order, W is the diversification parameter, and L is sort order of the selected item (e.g., the newest reorder score item). The diversification manager 102 then selects the item with the highest reorder score that has yet to be reordered for reordering (step 707). The process is then repeated for the remaining items in the list or a designated segment of the list.

FIG. 8 is a diagram of user interfaces used in the processes FIGS. 1-5, according to various embodiments. As shown, the UI 801 depicts a list of recommended items sorted using the recommendations scores as directly determined by the recommendation engine 103. In this case, the recommendations (e.g., Items 1-6 which are shown in display at once of total ten items) are very homogenous because the user has a strong preference for Restaurant X. However, this homogeneity can also be monotonous and boring to user, thereby discouraging the user from using the recommendation function. It is noted that usually all items are not visible on the display at once and therefore the UI with only one similar recommended item with six variations of the same may be boring for the user as in this example embodiment. Therefore there is need for better user experience and diversified list of items.

Thus sn contrast, UI 803 of this embodiment of invention depicts the same list after processing via the diversification manager 102 to provide greater variety and diversity of recommended items. As shown in the UI 801, Restaurant X for which the user has a strong preference is still well represented in the list two listings (e.g., Item 1 and Item 2), but other recommended items are also visible from different categories to spur user interest.

In addition, both UIs 801 and 803 provide list of multiple features (e.g., name, location, discount, and date) for each recommended item. It is contemplated that the diversification manager 102 can reorder or adjust the recommendation scores of the items based, at least in part, on diversification according to any one or more of the features describing the item in one embodiment of the invention. For example, in one embodiment, diversification may be based solely on the name so that similarity among the items is determined by name only. Alternatively, the diversification manager 102 can determine similarity based, at least in part, on any one or more of the other parameters such as location, discount, date, or any combination thereof. For example, the reordering can be used to diversify items based on location or date instead. In one further embodiment the list of recommended items sorted using the recommendations scores from recommendation engine is processed in the server and the diversification manager is functioning locally in the device. In one further embodiment the device gives option to select to use between the recommendation engine 103 or the diversification manager 102.

The processes described herein for diversifying recommendation results may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
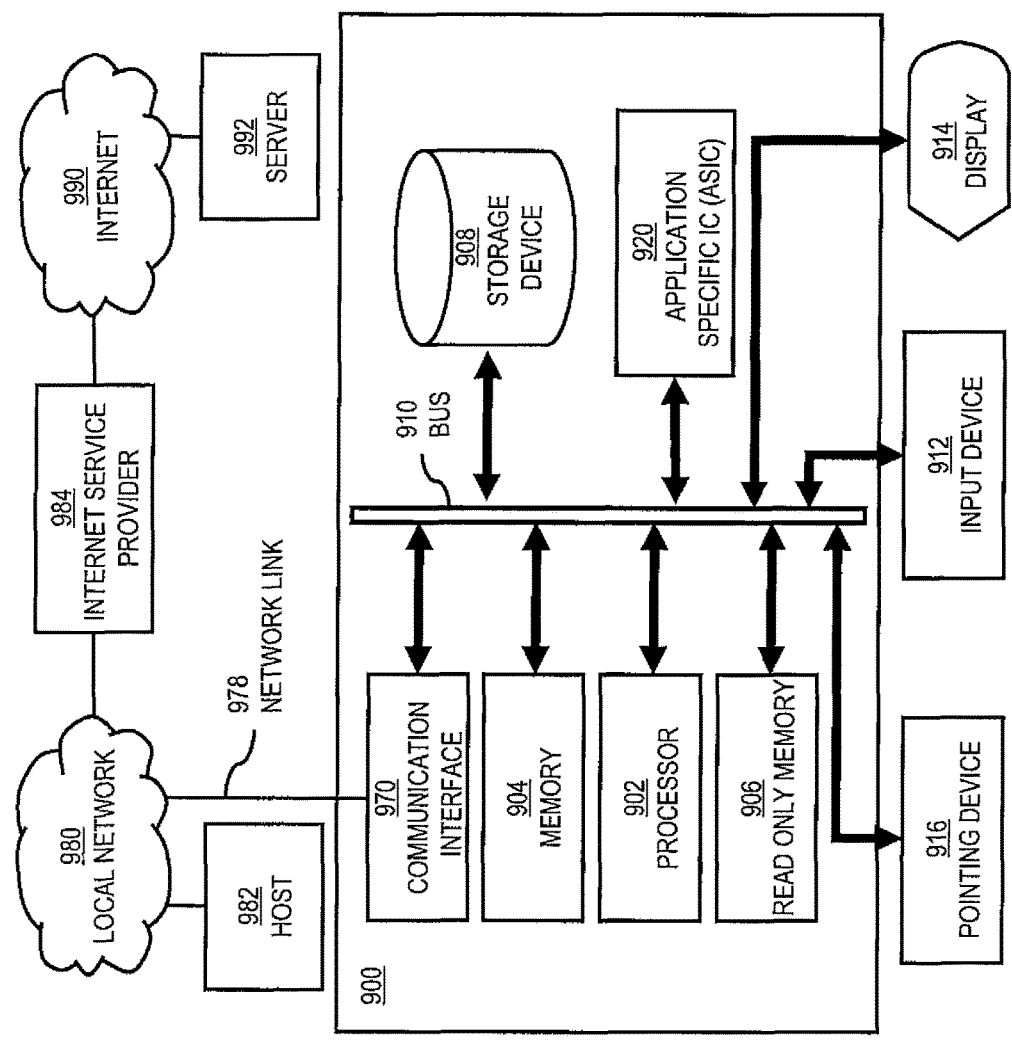
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to diversify recommendation results as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of diversifying recommendation results.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to diversifying recommendation results. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions.

Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or any other dynamic storage device, stores information including processor instructions for diversifying recommendation results. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for diversifying recommendation results, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 105 for diversifying recommendation results.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media, Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed to diversify recommendation results as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of diversifying recommendation results.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to diversifying recommendation results. The memory 1005 also stores the data associated with or generated by the execution of the inventive steps.

Figure 11:
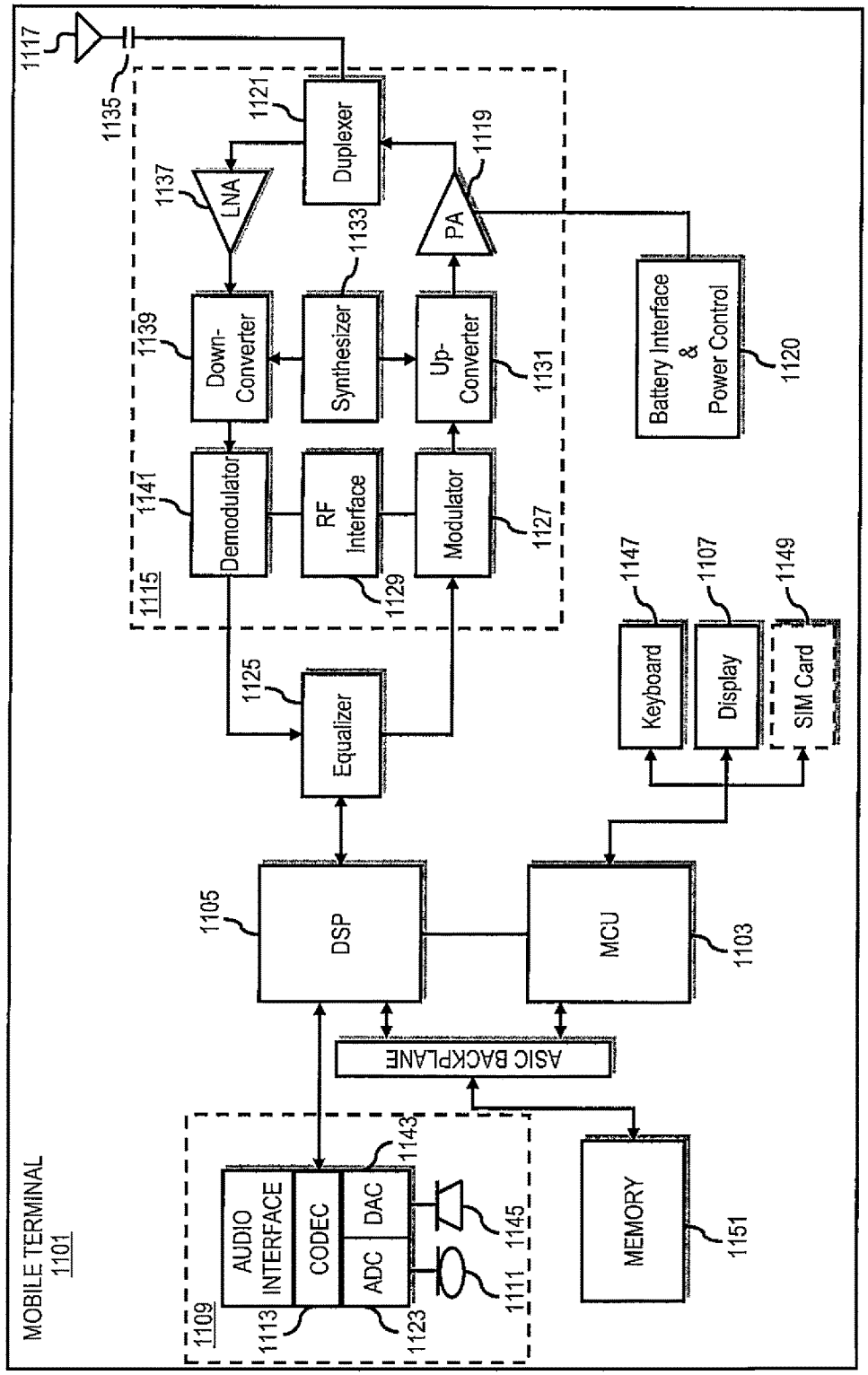
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of diversifying recommendation results. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of diversifying recommendation results. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (1MS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to diversify recommendation results. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

The invention claimed is:

1. A method for flexibly diversifying recommendation results, the method comprising:
   determining, utilizing at least one interface, a plurality of items,
      wherein respective items of the plurality of items are characterized by a plurality of features;
   determining, utilizing at least one processor recommendation scores associated with the determined plurality of items,
      wherein respective determined recommendation scores are associated with respective items of the determined plurality of items based on one or more preferences of a user,
      wherein each respective recommendation score is based on at least two features of the plurality of features associated with the respective items of the determined plurality of items;
   determining a sort order of the determined plurality of items based on the determined recommendation scores;
   selecting an item of the determined plurality of items based on the determined sort order location of the selected item, the determined respective recommendation score of the selected item or a combination thereof;
   determining similarity information of the selected item and one other item of the determined plurality, other than the selected item, according to a predetermined criteria associated with at least one feature of the selected item,
      wherein the at least one feature associated with determining the similarity information is different from at least one of the at least two features associated with determining the respective recommendation score of the selected item;
   if the determined similarity information of the one other item matches within a threshold of the predetermined criteria, based on a comparison with the at least one feature of the selected item and the respective recommendation scores of the selected item and the one other item,
      then processing the determined similarity information to determine a penalty to be associated with the one other item of the determined plurality;
   applying the determined penalty to determine an adjusted recommendation score for the one other item;
   determining an adjusted sort order of the plurality of items based on the determined adjusted recommendation score and the determined sort order,
      wherein the adjusted sort order diversifies the sort order by separating the one other item from the selected item in the adjusted sort order; and
   causing, utilizing the at least one interface, an electronic display of the plurality of items based on the determined adjusted sort order.

2. A method of claim 1, further comprising:
   if the determined similarity information of the one other item does not match within the threshold of the predetermined criteria,
      then determine if any remaining items of the plurality of items, other than the selected item and the one other item, have yet been selected or analyzed for any similarity information,
      wherein the improvement comprises an increased efficiency associated with determining an adjusted sort order of the plurality of items based on the determined adjusted recommendation score and the determined sort order rather than determining a plurality of adjusted recommendation scores for the plurality of items,
      wherein the features of the plurality of features and/or the at least one feature are based on one or more categories, key words, tags, item types, information sources, item locations or a combination thereof,
      wherein the one other item associated with the adjusted recommendation score is not visible on the electronic display of the plurality of items based on the application of the penalty.

3. A method of claim 1, further comprising:
  determining proximity information of the plurality of items, wherein the proximity information is with respect to location in the sort order; and
  processing and/or facilitating a processing of the proximity information to adjust the penalty.

4. A method of claim 1, further comprising:
  determining age information associated with the plurality of items; and
  processing and/or facilitating a processing of the age information to select the item and/or determine the one other item.

5. A method of claim 1, further comprising:
  determining the adjusted recommendation score for the one other item based, at least in part, on at least one diversification parameter.

6. A method of claim 1, wherein the determining of the adjusted recommendation score for the one other item is independent of the determining recommendation scores associated with the determined plurality of items.

7. An apparatus for flexibly diversifying recommendation results, the apparatus comprising:
  at least one processor; and
  at least one memory including computer program code for one or more programs,
  the at least one memory and the computer program code configured to, with the at least one processor, cause the apparatus to perform at least the following,
  determine, utilizing at least one interface, a plurality of items,
    wherein respective items of the plurality of items are characterized by a plurality of features;
  determine, utilizing the at least one processor recommendation scores associated with the determined plurality of items,
    wherein respective determined recommendation scores are associated with respective items of the determined plurality of items based on one or more preferences of a user,
    wherein each respective recommendation score is based on at least two features of the plurality of features associated with the respective items of the determined plurality of items;
  determine a sort order of the determined plurality of items based on the determined recommendation scores;
  select an item of the determined plurality of items based on the determined sort order location of the selected item, the determined respective recommendation score of the selected item or a combination thereof;
  determine similarity information of the selected item and one other item of the determined plurality, other than the selected item, according to a predetermined criteria associated with at least one feature of the selected item, wherein the at least one feature associated with determining the similarity information is different from at least one of the at least two features associated with determining the respective recommendation score of the selected item;
  if the determined similarity information of the one other item matches within a threshold of the predetermined criteria, based on a comparison with the at least one feature of the selected item and the respective recommendation scores of the selected item and the one other item,
    then process the determined similarity information to determine a penalty to be associated with the one other item of the determined plurality;
  apply the determined penalty to determine an adjusted recommendation score for the one other item;
  determine an adjusted sort order of the plurality of items based on the determined adjusted recommendation score and the determined sort order,
    wherein the adjusted sort order diversifies the sort order by separating the one other item from the selected item in the adjusted sort order; and
  cause, utilizing the at least one interface, an electronic display of the plurality of items based on the determined adjusted sort order.

8. An apparatus of claim 7, wherein the apparatus is further caused to:
  if the determined similarity information of the one other item does not match within the threshold of the predetermined criteria,
    then determining if any remaining items of the plurality of items, other than the selected item and the one other item, have yet been selected or analyzed for any similarity information,
    wherein the improvement comprises an increased efficiency associated with determining an adjusted sort order of the plurality of items based on the determined adjusted recommendation score and the determined sort order rather than determining a plurality of adjusted recommendation scores for the plurality of items,
    wherein the features of the plurality of features and/or the at least one feature are based on one or more categories, key words, tags, item types, information sources, item locations or a combination thereof,
    wherein the one other item associated with the adjusted recommendation score is not visible on the electronic display of the plurality of items based on the application of the penalty.

9. An apparatus of claim 8, wherein the apparatus is further caused to:
  determine proximity information of the plurality of items, wherein the proximity information is with respect to location in the sort order; and
  process and/or facilitate a processing of the proximity information to adjust the penalty.

10. An apparatus of claim 7, wherein the apparatus is further caused to:
  determine age information associated with the plurality of items; and
  process and/or facilitating a processing of the age information to select the item and/or determine the one other item.

11. An apparatus of claim 7, wherein the apparatus is further caused to:
  determine the adjusted recommendation score for the one other item based, at least in part, on at least one diversification parameter.

12. An apparatus of claim 7, wherein the determining of the adjusted recommendation score for the one other item is independent of the determining recommendation scores associated with the determined plurality of items.

13. A non-transitory computer readable medium containing a program product including one or more sequences of one or more instructions which, when executed by one or more processors, cause an apparatus to at least perform the steps for flexibly diversifying recommendation results:
  determine, utilizing at least one interface, a plurality of items,
    wherein respective items of the plurality of items are characterized by a plurality of features;

determine, utilizing the at least one processor recommendation scores associated with the determined plurality of items,
   wherein respective determined recommendation scores are associated with respective items of the determined plurality of items based on one or more preferences of a user,
   wherein each respective recommendation score is based on at least two features of the plurality of features associated with the respective items of the determined plurality of items;
determine a sort order of the determined plurality of items based on the determined recommendation scores;
select an item of the determined plurality of items based on the determined sort order location of the selected item, the determined respective recommendation score of the selected item or a combination thereof;
determine similarity information of the selected item and one other item of the determined plurality, other than the selected item, according to a predetermined criteria associated with at least one feature of the selected item,
   wherein the at least one feature associated with determining the similarity information is different from at least one of the at least two features associated with determining the respective recommendation score of the selected item;
if the determined similarity information of the one other item matches within a threshold of the predetermined criteria, based on a comparison with the at least one feature of the selected item and the respective recommendation scores of the selected item and the one other item,
   then process the determined similarity information to determine a penalty to be associated with the one other item of the determined plurality;
apply the determined penalty to determine an adjusted recommendation score for the one other item;
determine an adjusted sort order of the plurality of items based on the determined adjusted recommendation score and the determined sort order,
   wherein the adjusted sort order diversifies the sort order by separating the one other item from the selected item in the adjusted sort order; and
cause, utilizing the at least one interface, an electronic display of the plurality of items based on the determined adjusted sort order.

14. The non-transitory computer readable medium of claim 13, wherein the apparatus is further caused to:
   if the determined similarity information of the one other item does not match within the threshold of the predetermined criteria,
      then determine if any remaining items of the plurality of items, other than the selected item and the one other item, have yet been selected or analyzed for any similarity information,
      wherein the improvement comprises an increased efficiency associated with determining an adjusted sort order of the plurality of items based on the determined adjusted recommendation score and the determined sort order rather than determining a plurality of adjusted recommendation scores for the plurality of items,
      wherein the features of the plurality of features and/or the at least one feature are based on one or more categories, key words, tags, item types, information sources, item locations or a combination thereof,
      wherein the one other item associated with the adjusted recommendation score is not visible on the electronic display of the plurality of items based on the application of the penalty.

15. The non-transitory computer readable medium of claim 13, wherein the apparatus is further caused to:
   determine proximity information of the plurality of items, wherein the proximity information is with respect to location in the sort order; and
   process and/or facilitate a processing of the proximity information to adjust the penalty.

16. The non-transitory computer readable medium of claim 13, wherein the apparatus is further caused to:
   determine age information associated with the plurality of items; and
   process and/or facilitating a processing of the age information to select the item and/or determine the one other item.

17. The non-transitory computer readable medium of claim 13, wherein the determining of the adjusted recommendation score for the one other item is independent of the determining recommendation scores associated with the determined plurality of items.

* * * * *